Oct. 30, 1962   M. R. SIMMONDS   3,061,054
FASTENING METHODS AND MEANS FOR STRUCTURAL SANDWICHES
Filed Aug. 18, 1958   3 Sheets-Sheet 1
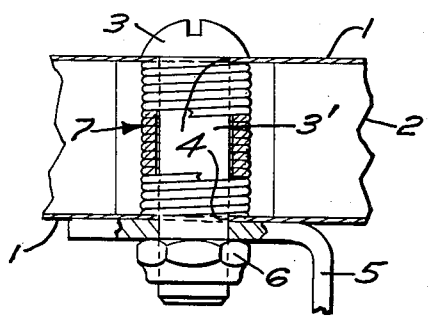
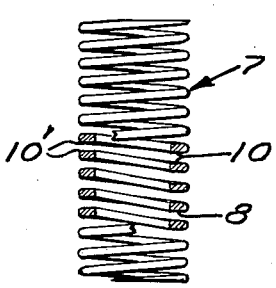
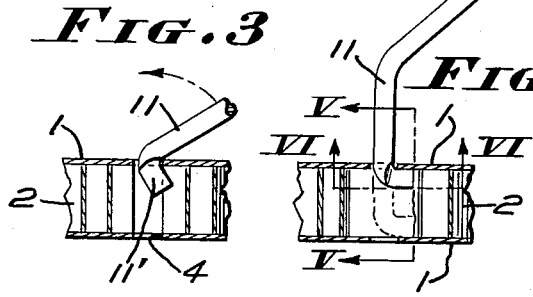
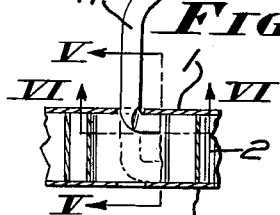
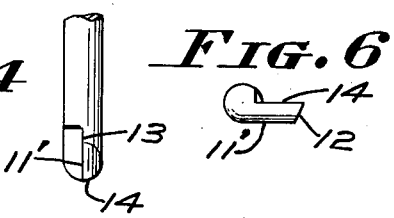
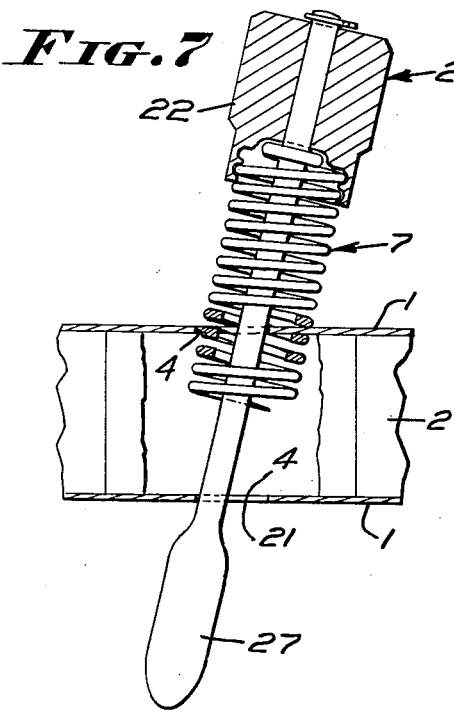
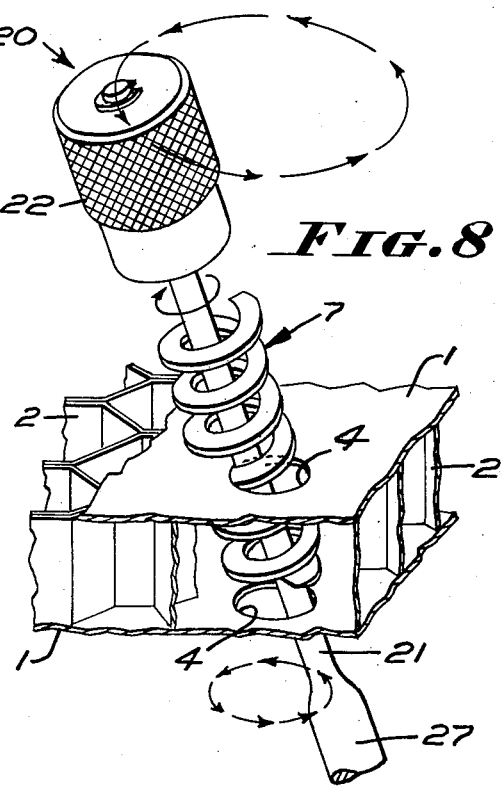

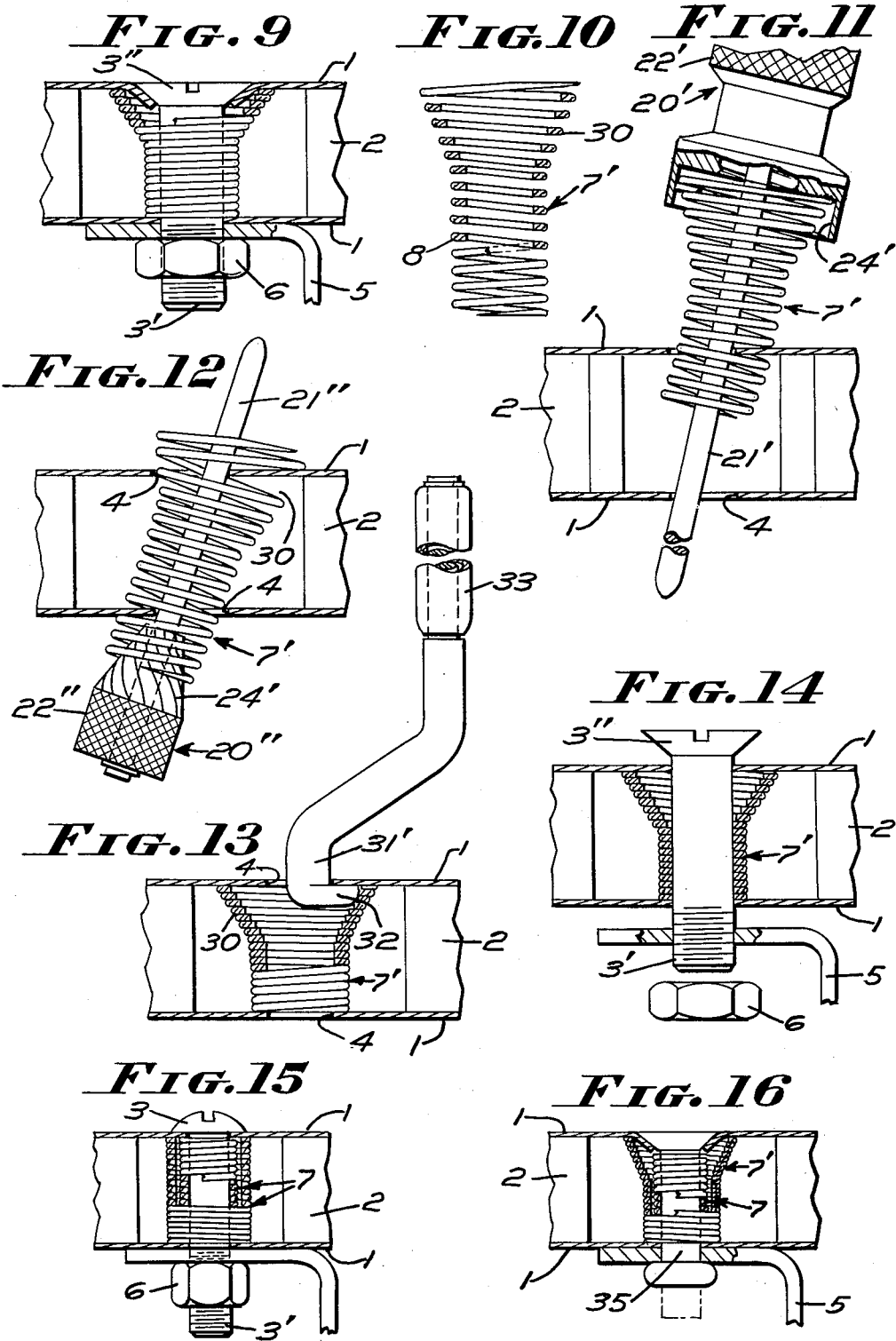

Oct. 30, 1962     M. R. SIMMONDS     3,061,054
FASTENING METHODS AND MEANS FOR STRUCTURAL SANDWICHES
Filed Aug. 18, 1958     3 Sheets-Sheet 3
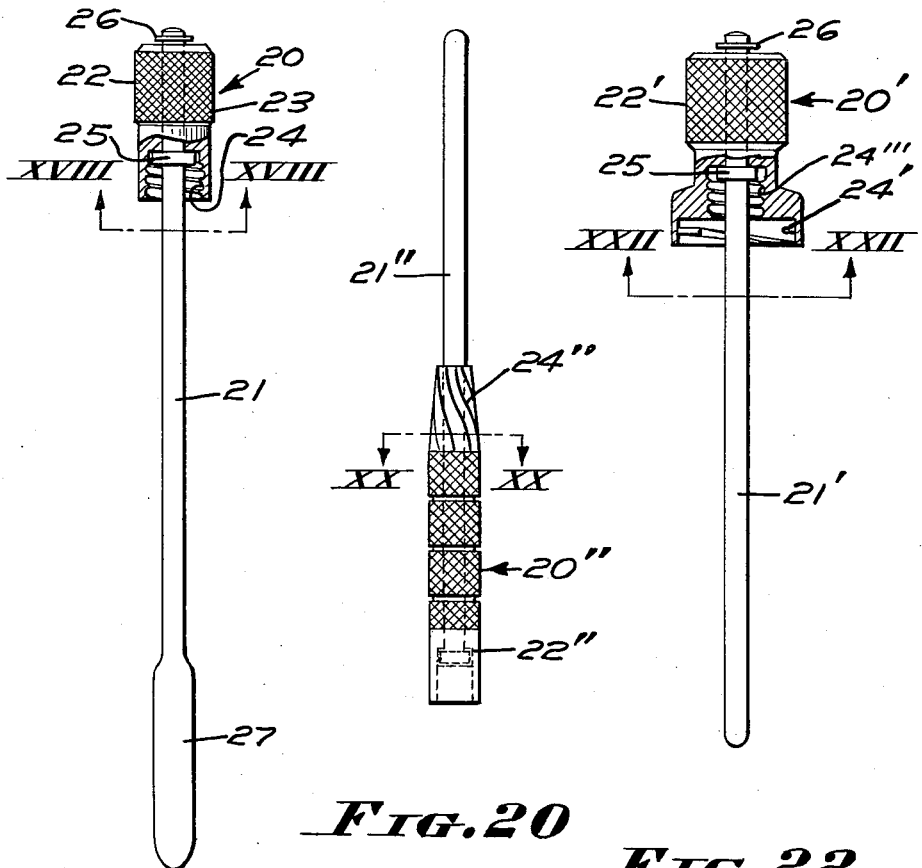
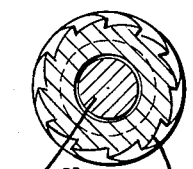
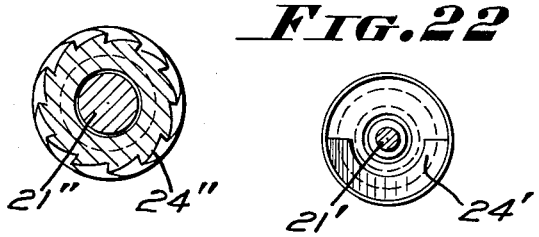
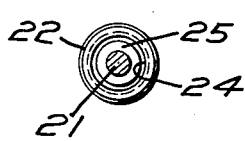
INVENTOR:
MILO R. SIMMONDS
BY:
Beau, Brooks, Buckley & Beau,
ATTORNEYS.

United States Patent Office 3,061,054
Patented Oct. 30, 1962

3,061,054
FASTENING METHODS AND MEANS FOR STRUCTURAL SANDWICHES
Milo R. Simmonds, 34 Hirschfield Drive, Williamsville, N.Y.
Filed Aug. 18, 1958, Ser. No. 755,524
6 Claims. (Cl. 189—34)

This invention relates generally to the fastener art, particularly as applied to double wall structures and structural sandwiches of the type having relatively high strength skins or laminae spaced apart by a relatively weak core. More specifically, this invention is concerned with the provision of spacer means which are inserted between the pre-assembled high strength laminae and which receive the fastening means therethrough, and to methods and means for assembling such spacer means in the structure.

Structures of this type offer many advantages and have a wide area of application, but fastening to such sandwiches presents a serious problem because the stabilizing core can not carry the fastening load and it is necessary to transfer such fastening loads to the relatively high strength laminae in order to avoid distorting the core.

Accordingly, it is a primary object of this invention to provide means enabling fastening to such structures wherein the fastening load is transferred directly to the relatively high strength, stressed laminae without crushing the relatively weak core material and/or deforming the skin.

It is another object of this invention to provide the foregoing in an arrangement which is relatively simple and inexpensive and easy to install while being extremely durable and dependable in operation.

To this end, I provide, and invention will be found to reside in spacing means characterized in one aspect thereof by the provision of a hollow member of spirally wound form, which spacer member has a solid length, in closed condition, substantially equal to the desired spacing distance between the high strength skins of the structure.

I also provide, and invention will be found to reside in a method of inserting such a spacer member in the pre-assembled structure, which method is characterized in one aspect thereof by rotating the spacer member about substantially its lengthwise axis to thread it through an opening in one lamination, until the spacer member extends partially therethrough into the space between the laminations, and then rolling the spacer member in the opposite direction about the periphery of the opening, in a manner causing the spacer member to continue threading through the opening until it is inserted entirely between the laminations.

I also provide, and invention will be found to reside in a tool for inserting the spacer member into the structure after the latter has been assembled, which tool is characterized in one aspect thereof by the provision of an elongated shaft of a length to completely receive the spacer member thereon for rotation about the lengthwise axis of the shaft, with a head adjacent one end of the shaft rotatable about the lengthwise axis thereof, the head having a clutching portion facing the opposite end portion of the shaft and adapted to receive one end of the spacer member and lock thereto upon rotation of the head in one direction relative to the spacing member.

The foregoing and other objects, advantages and characterizing features of my invention will become clearly apparent from the ensuing detailed description of certain presently preferred embodiments thereof, considered in conjunction with the accompanying drawings forming a part thereof wherein like reference numerals denote like parts throughout the various views and wherein:

FIG. 1 is a fragmentary view, partly in section and partly in elevation, of a structural sandwich and a spacer member of my invention assembled therein, with a fastening member therethrough;

FIG. 2 is a view, partly in section and partly in elevation, of the spacer member of FIG. 1 in its open or expanded, unassembled condition;

FIGS. 3 and 4 are fragmentary views, partly in section and partly in elevation, illustrating how the core material is removed to receive the spacer member of FIG. 2, certain parts being broken away for ease of illustration;

FIGS. 5 and 6 are fragmentary, elevational and bottom plan views, respectively, of the cutting tool shown in FIGS. 3 and 4, being taken about along lines V—V and VI—VI, respectively, of FIG. 4;

FIGS. 7 and 8 are views, partly in section and partly in elevation, illustrating sequential steps in a method of assembling the spacer member of FIG. 2 into the sandwich in accord with my invention, utilizing an inserting tool of my invention;

FIGS. 9 and 10 are views corresponding to FIGS. 1 and 2, respectively, but illustrating a modified spacer member having a portion of tapered side wall form;

FIGS. 11 and 12 are views corresponding to FIGS. 7 and 8, respectively, illustrating sequential steps in a method assembling the spacer member of FIG. 10 in the structural sandwich in accord with my invention;

FIG. 13 is a view, partly in elevation and partly in section, illustrating how the assembled spacer of FIG. 10 is centered in the structural sandwich;

FIG. 14 is a view similar to FIG. 9, illustrating the condition of the assembled spacer and sandwich prior to the tightening of the fastener therethrough;

FIGS. 15 and 16 are views corresponding to FIGS. 1 and 9, respectively, but showing more complex spacer assemblies;

FIG. 17 is a side elevational view, partly in section, of the spacer inserting tool illustrated in FIGS. 7 and 8;

FIG. 18 is a transverse sectional view thereof, taken about on line XVIII—XVIII of FIG. 17;

FIG. 19 is a side elevational view of the spacer inserting tool illustrated in FIG. 12;

FIG. 20 is a transverse sectional view thereof, taken about on line XX—XX of FIG. 19;

FIG. 21 is a side elevational view, partly in section of the spacer inserting tool illustrated in FIG. 11; and FIG. 22 is a transverse sectional view thereof taken about on line XXII—XXII of FIG. 21.

Referring now in detail to the embodiment of FIGS. 1–8, there is shown a structural sandwich of conventional construction, which per se comprises no part of my invention. This sandwich comprises a pair of high strength skins or laminae 1, bonded to and spaced apart by a low density core 2 of alveolar or other conventional construction. The sandwich comprising parts 1 and 2 can be of any known construction, or variation thereof, my invention being directed to the problem of directly transferring fastening or attachment loads to the laminae 1, without crushing the core 2 or deforming the skin. Thus there is shown by way of example in FIG. 1 an attaching bolt having a head 3 and a shank 3', which bolt extends through alined openings 4 in laminae 1 for securing an attaching angle 5 against one of the laminae 1, the angle 5 being locked in place as by a nut 6, and it is necessary that the attaching load be carried by the laminae 1 substantially to the exclusion of the core 2. This is accomplished in accord with my invention by a spacer member generally designated 7.

Spacer 7 is of helical or spirally wound form, comprising a continuous wire 8 wound in the form of a helix or spiral, and can be wound in an extended or open manner, as illustrated in FIG. 2, substantially closed, or any degree of closeness of wind between these extremes.

Spacer 7 is adapted to fit between the laminae 1 in alinement with openings 4, and to receive the bolt shank 3' therethrough, the spacer having an inner diameter equal to the diameter of the bolt shank 3', and therefore at least equal to substantially the diameter of the openings 4. To transfer the attaching loads directly to laminae 1, spacer 7 has a solid length, in its closed condition illustrated in FIG. 1, substantially equal to the desired normal spacing between the laminae 1. Therefore, when spacer 7 is inserted in the sandwich its opposite ends bear against the inner wall surfaces of laminae 1, so that fastening stresses are confined to the laminae 1 with the core 2 being reinforced and maintained free of such stresses by the solid spacer 7.

To provide maximum bearing contact area, and therefore maximum stability, the ends of spacer 7 are squared and lie in substantially parallel planes which are substantially normal to the lengthwise axis of the spacer. Further to this end, the wire 8 comprising spacer 7 preferably is of flat sided form on the top and bottom sides thereof, as illustrated at 10 in FIG. 2. However, this cross sectional configuration is not entirely essential, and round, square and/or rectangular cross sectional configurations can be used.

Also, as will be described hereinafter spacer 7 is threaded through the openings 4 into the space between laminae 1, and to avoid scratching and marring of the skins 1 the outer corners of wire 8 preferably are curved and rounded as indicated at 10' in FIG. 2.

When assembling spacer 7 in the pre-assembled structural sandwich 1, 2, the aligned openings 4 are first formed in the laminae 1, and then the core material 2 between openings 4 is removed to provide room for the spacer 7. This is readily accomplished by a tool such as the back spotface tool illustrated in FIGS. 3–6, which comprises a shaft 11 of a diameter less than that of openings 4 terminating at one end in a bit or blade portion 11' extending at generally a right angle thereto, the bit having a cutting edge 12 at its outer end and cutting edges 13 and 14 on the top and bottom thereof. To enable insertion of the bit 11', the diagonal distance across the heel thereof is less than the diameter of openings 4. A handle 15, rotatable on an offset portion 16 of shaft 11, enables the operator, after inserting the bit 11' as illustrated in FIG. 3, to rotate shaft 11 about its axis while raising and lowering bit 11' between the laminae 1, as illustrated in FIG. 4, so that a generally cylindrical piece of core material is removed. While it is not necessary that all of the material in such cylinder be removed, it is desirable to remove the glue or resin from the underside of both skin sheets 1. In some cases, it is more satisfactory to use the tool from both sides of the sandwich. If desired, shaft 11 can be straight and used in either a hand or power drill.

The spacer 7 of FIG. 2 is threaded into the sandwich in accord with my invention, and this is conveniently accomplished by means of a tool generally designated 20, which tool is illustrated in detail in FIGS. 17 and 18. Tool 20 comprises an elongated shaft 21, of a length exceeding the length of spacer member 7, so as to extend therethrough, and a diameter less than the difference between the diameter of opening 4 and the width of wire 8. Shaft 21 is provided adjacent one end with a handle 22 freely rotatable thereon about the axis thereof, which handle can be knurled, as indicated at 23, for a better grip and is formed at the inner end thereof with a counter bore 24 which is threaded internally to receive one end of spacer 7 in threaded engagement therewith. This provides a threaded clutching action, with the spacer 7 stopping when it bottoms in the threads, and the threads can be tapered or straight. Alternatively, counter bore 24 can be a tapered hole, either smooth or serrated, with the spring acting as a self energizing brake when forced thereinto.

Handle 22 is retained on shaft 21, being loosely held against a bearing shoulder 25 on the shaft as by a pin 26. In addition, it is desirable, although not essential, that the opposite end portion of shaft 21 be of an elongated, bulbous form, as illustrated at 27. The diameter of the bulbous end 27 must be slightly less than the inside diameter of spacer 7.

For assembly, spacer 7 is slipped onto shaft 21 and threaded into handle 22. Then, shaft 21 is inserted through the aligned openings 4 and caused to bear against one side edge of one opening 4 and the opposite side edge of the other opening, as shown in FIGS. 7 and 8. Handle 22 then is rotated in a direction causing it to clutch with the spacer 7 and thread the same partially through the uppermost opening 4, this action being continued, for example, until the spacer 7 is in approximately the position illustrated in FIG. 7. The spacer 7 can be inserted in this manner anywhere from part of a turn to all the way down until handle 22 strikes laminae 1.

Then, handle 22 is turned in the opposite direction out of clutching engagement with the adjacent end of spacer 7. The handle 20 then is swung in such opposite direction in an orbit about the center line of openings 4, while maintaining contact between shaft 21 and opposed peripheral side edges of the openings 4, as illustrated in FIG. 8. Upon doing this, shaft 21 rolls around the periphery of each opening 4, rotating in the original direction in a manner similar to the sun gear in a planetary gear train. At or near the point where shaft 21 contacts the opening 4 in the upper skin 1, the spacer 7 passes through the upper skin opening and as the shaft 21 rolls around the edge of the opening it moves the spacer continually to a new entry point which is further and further up the spacer. Due to the friction components of the above action, the spacer 7 rotates very slowly in the same direction as the inserting tool 20 is swung.

Thus, after being rotated about its axis in one direction until it is partially threaded through an opening 4, spacer 7 is swung in the opposite direction in a generally conical path about the centerline of the opening. This action is continued until the spacer 7 is entirely between the two laminae 1 of the sandwich, and several continued rotations of the shaft serve to center both the upper and the lower end of the spacer with respect to the openings. As the inserting tool 20 is removed from the openings, the bulbous end section 27 further insures centering of the spacer, and the spacer is ready to have a bolt, rivet or other fastening inserted therethrough for attaching a member to the sandwich, as illustrated in FIG. 1.

The degree to which the inserting tool 20 is withdrawn prior to the final threading action illustrated in FIG. 8 can vary depending on spacer size, the end condition of the spacer, the thickness of laminae 1 and the like. In some instances it will be desirable to withdraw the tool until the bulbous portion 27 is well inside the opening 4 in the lower skin 1, which will prevent the spacer 7 from emerging through the lower opening 4 and out the other side of the sandwich.

While it is not necessary to use a tool such as illustrated at 20, and/or the above described method for inserting spacer 7, they have been devised to facilitate and render safer the inserting of the spacer, and therefore are highly desirable.

Where it is desired to use a fastener having a tapered head, as illustrated at 3" in FIG. 9, with the head being countersunk into the surface of laminae 1, a spacer 7' having a tapered end 30, as illustrated in FIG. 10, is used. The spacer 7' is formed of wire 8, preferably of the same cross sectional configuration as in the spacer 7 shown in FIG. 2. However, one end portion 30 of spacer 7' is tapered to receive the tapered head 3" in countersunk relation to the adjacent lamina 1, as illustrated in FIG. 9.

Spacer 7' can be inserted through an opening 4 in the same manner as described above and illustrated in FIGS. 7 and 8, if the large, tapered end is inserted first. However, this requires that a substantial amount of core material 2 be removed, and where this is not desired I provide alternate means and methods for inserting spacer 7', as follows.

The core material is removed as outlined above and illustrated in FIGS. 3–6. Then, I insert the spacer 7' using a tool 20' similar to the tool 20 in that it has a shaft 21' of a diameter less than the difference between the diameter of opening 4 and the width of wire 8 and, at one end thereof, a rotatable head 22' held in place by a shoulder 25 on the shaft and a pin 26, as illustrated in FIGS. 21 and 22. The head 22' is counterbored as indicated at 24' and is threaded for engagement with the enlarged, tapered end 30 of spacer 7', although a tapered counterbore could be used. The bulbous end 27 on the inserting tool 20 is not present on this tool 20'.

FIG. 21 also shows a smaller counterbore 24''' which will engage the small end of the tapered spacer or either end of the cylindrical spacer, whereby this tool can be used in place of the tool of FIGS. 17 and 18 under most conditions.

The tool 20' is operated in much the same manner as the tool 20, with shaft 21' bearing against opposed peripheral edge portions of the aligned openings and the head 22' being rotated to thread spacer 7' small end first through the uppermost opening 4 as illustrated in FIG. 11. Spacer 7' is threaded on through the lowermost opening 4, until head 22' strikes lamina 1, with the spacer assuming approximately the position illustrated in FIG. 12. Then, another inserting tool 20'' having a shaft 21'' of a diameter less than the difference between the diameter of opening 4 and the width of wire 8, and a handle 22' rotatable thereon having a tapered, spirally serrated clutching surface 24'' as illustrated in FIGS. 19 and 20, is fitted through openings 4. Shaft 21'' is caused to bear against opposed side edges of openings 4, and handle 22' is rotated to turn spacer 7' in the same direction as with the tool 20', until the tapered end 30 is entirely between the skins 1. To this end, part 24'' of tool 20'' clutches upon rotation in the direction opposite to that causing part 24' of tool 20' to clutch Then, tool 20'' is pulled out of clutching engagement with spacer 7', until the shaft 21'' projects just slightly beyond the upper skin 1, and the tool is rotated in the manner described above in connection with FIG. 8, swinging spacer 7 in the opposite direction about the centerline of opening 4 which causes the small end of spacer 7' to travel back into the lower opening 4 and terminate in a position as illustrated in FIG. 13.

In the event spacer 7' is not precisely centered relative to openings 4, I provide a centering tool having a shank 31 terminating in a right angled tool part 32 and an offset handle 33 journaled on the shaft, which latter is simply slip-fitted through the opening 4 and then rotated to cause the tapered end 30 of spacer 7' to be centered.

The strength of the assembly can be increased, by utilizing two spacers such as two cylindrical spacers 7, one inside the other, as illustrated in FIG. 15.

When using a tapered spacer 7', an inside spacer 7 can be provided to support the inner end of the countersunk laminae and to prevent fastening means such as a rivet 35 from expanding when it is being driven or headed, as illustrated in FIG. 16. In this case, the inner spacer 7 will have a solid, closed length less than the normal spacing between laminae 1, to accommodate countersinking of rivet 35.

Accordingly, it is seen that my invention fully accomplishes its intended objects. While only certain embodiments have been disclosed and described in detail herein, I do not thereby intend that my invention be limited thereto. Rather, this disclosure is intended to be illustrative only and I am well aware that modifications and variations will readily occur to those skilled in the art, without departing from the spirit of my invention or the scope of the appended claims.

Having fully disclosed and completely described my invention, together with its mode of operation, what I claim as new is:

1. In combination with a structure having spaced apart laminae having aligned openings therein receiving a fastening member, a spacer member of spirally wound wire positioned between said laminae in alinement with said openings, said spacer member having an inner diameter sufficient to receive said fastening member, said spacer member being in closed condition and having a length in closed condition substantially equal to the spacing desired to be maintained between said laminae, thereby to transfer the fastening load to said laminae, said spacer member being of generally cylindrical form throughout, a second generally cylindrical spacer member of spirally wound form fitted into the first mentioned spacer, said second spacer member having an inside diameter sufficient to receive a fastening member therethrough.

2. In combination with a structure having spaced apart laminae, said laminae having alined openings therein receiving a fastening member, a spacer member of spirally wound wire positioned between said laminae in alinement with said openings, said spacer member having an inner diameter sufficient to receive said fastening member, said spacer member being in closed condition and having a length in closed condition substantially equal to the spacing desired to be maintained between said laminae, thereby to transfer the fastening load to said laminae, said fastening member having a tapered head in countersunk relation to the adjacent one of said laminae, one end portion of said spacer being of tapered inner and outer side wall form to receive said tapered head of the fastening member, each convolution of said one end portion of said spacer member bearing against the immediately adjacent convolution generally lengthwise of said spacer member, and a generally cylindrical second spirally wound spacer member fitted within said tapered spacer member, said second spacer member having a solid length less than the desired spacing between said laminae to accommodate such countersunk tapered fastener head and bearing against the inner end of the countersunk one of said laminae in supporting relation thereto.

3. In combination with a structure having spaced apart laminae, said laminae having alined openings therein receiving a fastening member, a spacer member of spirally wound wire positioned between said laminae in alinement with said openings, said spacer member having an inner diameter sufficient to receive said fastening member, said spacer member being in closed condition and having a length in closed condition substantially equal to the spacing desired to be maintained between said laminae, thereby to transfer the fastening load to said laminae, said fastening member having a tapered head in countersunk relation to the adjacent one of said laminae, one end portion of said spacer member being of tapered inner and outer side wall form to receive said tapered head of the fastening member, each convolution of said one end portion of said spacer member bearing against the immediately adjacent convolution generally lengthwise of said spacer member.

4. In combination with a structural member having a pair of laminae disposed in spaced apart relation and means joining said laminae to maintain such spaced relation, fastening means for securing mechanism externally to said member; said fastening means including a spacer for disposition between and in abutting relation to opposed inner surfaces of said laminae to prevent crushing together of the structure in the region of the spacer, said spacer being in the form of a sleeve-like length of spirally wound wire in which adjacent flights throughout the length thereof are dimensioned to abut each other and provide a solid length commensurate with the spacing between said laminae and resistive to compression, said laminae having alined openings therein of less diameter than the diameter of said spacer, said spacer being disposed between said laminae with the opposite ends thereof engaging respective laminae at regions thereof surrounding and defining said openings therein.

5. In combination with a structural member having a pair of high strength laminae disposed in spaced apart relation and a relatively weak core fixedly secured to and joining said laminae to maintain such spaced relation, fastening means for securing mechanism externally to said member; said fastening means including a spacer for disposition between and in abutting relation to opposed inner surfaces of said laminae to prevent crushing together of the structure in the region of the spacer, said spacer being in the form of a sleeve-like length of spirally wound wire in which adjacent flights throughout the length thereof are dimensioned to abut each other and provide a solid length commensurate with the spacing between said laminae and resistive to compression, said laminae having alined openings therein of less diameter than the diameter of said spacer, said spacer being disposed between said laminae with the opposite ends thereof engaging respective laminae at regions thereof surrounding and defining said openings therein.

6. In combination with a structural member having a pair of high strength laminae disposed in spaced apart relation and means joining said laminae to maintain such spaced relation, fastening means for securing mechanism externally to said member; said fastening means including a spacer for disposition between and in abutting relation to opposed inner surfaces of said laminae to prevent crushing together of the structure in the region of the spacer, said spacer being in the form of a sleeve-like length of spirally wound wire in which adjacent flights throughout the length thereof are dimensioned to abut each other and provide a solid length commensurate with the spacing between said laminae and resistive to compression, said laminae having alined openings therein of less diameter than the diameter of said spacer, said spacer being disposed between said laminae with the opposite ends thereof engaging respective laminae at regions thereof surrounding and defining said openings therein, said fastening means also including headed screw thread means projecting through the passageway defined by said openings and said spacer and bearing upon said laminae in the regions thereof engaged by the ends of said spacer.

References Cited in the file of this patent

UNITED STATES PATENTS

| | | |
|---|---|---|
| 1,816,282 | Heyner et al. | July 28, 1931 |
| 2,210,353 | Barnes | Aug. 6, 1940 |
| 2,447,272 | Parkes | Aug. 17, 1948 |
| 2,585,557 | Kreimendahl | Feb. 12, 1952 |
| 2,700,172 | Rohe | Jan. 25, 1955 |
| 2,721,376 | Showman | Oct. 25, 1955 |
| 2,811,772 | Johnson | Nov. 5, 1957 |
| 2,853,746 | Spencer | Sept. 30, 1958 |

UNITED STATES PATENT OFFICE
CERTIFICATE OF CORRECTION

Patent No. 3,061,054            October 30, 1962

Milo R. Simmonds

It is hereby certified that error appears in the above numbered patent requiring correction and that the said Letters Patent should read as corrected below.

Column 6, line 8, after "laminae" insert -- , said laminae --.

Signed and sealed this 2nd day of April 1963.

(SEAL)
Attest:

ESTON G. JOHNSON            DAVID L. LADD

Attesting Officer            Commissioner of Patents